(12) United States Patent
Lam et al.

(10) Patent No.: US 7,325,019 B2
(45) Date of Patent: Jan. 29, 2008

(54) MANAGING DATA REPLICATION POLICIES

(75) Inventors: Sahn Lam, Daly City, CA (US); Yinfung Fong, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 436 days.

(21) Appl. No.: 10/798,991

(22) Filed: Mar. 12, 2004

(65) Prior Publication Data

US 2005/0203908 A1 Sep. 15, 2005

(51) Int. Cl.
G06F 12/00 (2006.01)
(52) U.S. Cl. ..................................... 707/204
(58) Field of Classification Search ............... 707/204, 707/7, 3
See application file for complete search history.

(56) References Cited

U.S. PATENT DOCUMENTS

| | | | |
|---|---|---|---|
| 6,345,294 | B1 | 2/2002 | O'Toole et al. |
| 7,155,463 | B1* | 12/2006 | Wang et al. ................. 707/204 |
| 2003/0065942 | A1* | 4/2003 | Lineman et al. ............ 713/201 |
| 2003/0145086 | A1* | 7/2003 | O'Reilly ..................... 709/226 |
| 2003/0154238 | A1 | 8/2003 | Murphy et al. |
| 2003/0158920 | A1 | 8/2003 | Lynch et al. |
| 2004/0093555 | A1* | 5/2004 | Therrien et al. ............ 714/805 |
| 2004/0098419 | A1* | 5/2004 | Bantz et al. ................. 707/203 |
| 2004/0193703 | A1* | 9/2004 | Loewy et al. ............... 709/220 |
| 2005/0010529 | A1* | 1/2005 | Zalewski et al. ............ 705/54 |
| 2005/0033757 | A1* | 2/2005 | Greenblatt et al. ......... 707/100 |
| 2005/0060313 | A1* | 3/2005 | Naimat et al. ................. 707/7 |
| 2005/0120025 | A1* | 6/2005 | Rodriguez et al. ........... 707/10 |
| 2006/0069590 | A1* | 3/2006 | Fox et al. ...................... 705/1 |
| 2006/0080667 | A1* | 4/2006 | Sanghvi et al. ............. 719/310 |

* cited by examiner

Primary Examiner—Wilson Lee
Assistant Examiner—Angela M Lie
(74) Attorney, Agent, or Firm—Blakely Sokoloff Taylor & Zafman LLP

(57) ABSTRACT

An application implemented on a server in a network of storage servers can be provided to manage the data replication relationships implemented between the storage servers of the network. In one embodiment, this server can be designated the manager server, and can provide replication relationships to enable a user to centrally manage the plurality of data replication relationships. In one embodiment, the manager server includes a network adapter to connect the manager server to a network, a storage facility to contain a data structure configured to represent the plurality of data replication relationships, and a processor to automatically input the plurality of data replication relationships into the data structure, to automatically generate a plurality of replication policies, and to apply at least one of the plurality of replication policies to each data replication relationship.

9 Claims, 5 Drawing Sheets

MANAGING DATA REPLICATION POLICIES

FIELD OF THE INVENTION

At least one embodiment of the present invention pertains to data storage and backup techniques, and more particularly, to a method and apparatus for managing data replication policies.

BACKGROUND

A file server is a type of storage server that operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance that attaches to a network, such as a local area network (LAN) or a corporate intranet. An example of such an appliance is any of the NetApp Filer products made by Network Appliance, Inc. in Sunnyvale, Calif.

A file server can be used to backup data, among other things. One particular type of data backup technique is known as data replication, and is sometimes referred to as "mirroring". Data replication involves backing up data stored at a primary site by storing an exact duplicate (an image) of the data at a remote secondary site. The purpose is that, if data is ever lost at the primary site, it can be recovered from the secondary site.

In a simple example of a mirroring configuration, a source file server located at the primary site may be coupled locally to a first set of mass storage devices, to a set of clients through a local area network (LAN), and to a destination file server located at a remote site through a wide area network (WAN) or metropolitan area network (MAN). The destination storage server located at the remote site is coupled locally to a second set of mass storage devices at the secondary site.

Setting up and managing various data replication relationships in such a simple two file server system is relatively straightforward. However, in an environment with tens, hundreds, or even thousands of file servers, managing the data replication relationships becomes burdensome.

SUMMARY OF THE INVENTION

An application implemented on a server in a network of storage servers can be provided to manage the data replication relationships implemented between the storage servers of the network. In one embodiment, this server can be designated the manager server, and can provide replication relationships to enable a user to centrally manage the plurality of data replication relationships. In one embodiment, the manager server includes a network adapter to connect the manager server to a network, the network including a plurality of storage servers, the plurality of storage servers implementing a plurality of data replication relationships, a storage facility to contain a data structure configured to represent the plurality of data replication relationships, and a processor to automatically input the plurality of data replication relationships into the data structure, to automatically generate a plurality of replication policies, and to apply at least one of the plurality of replication policies to each data replication relationship.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
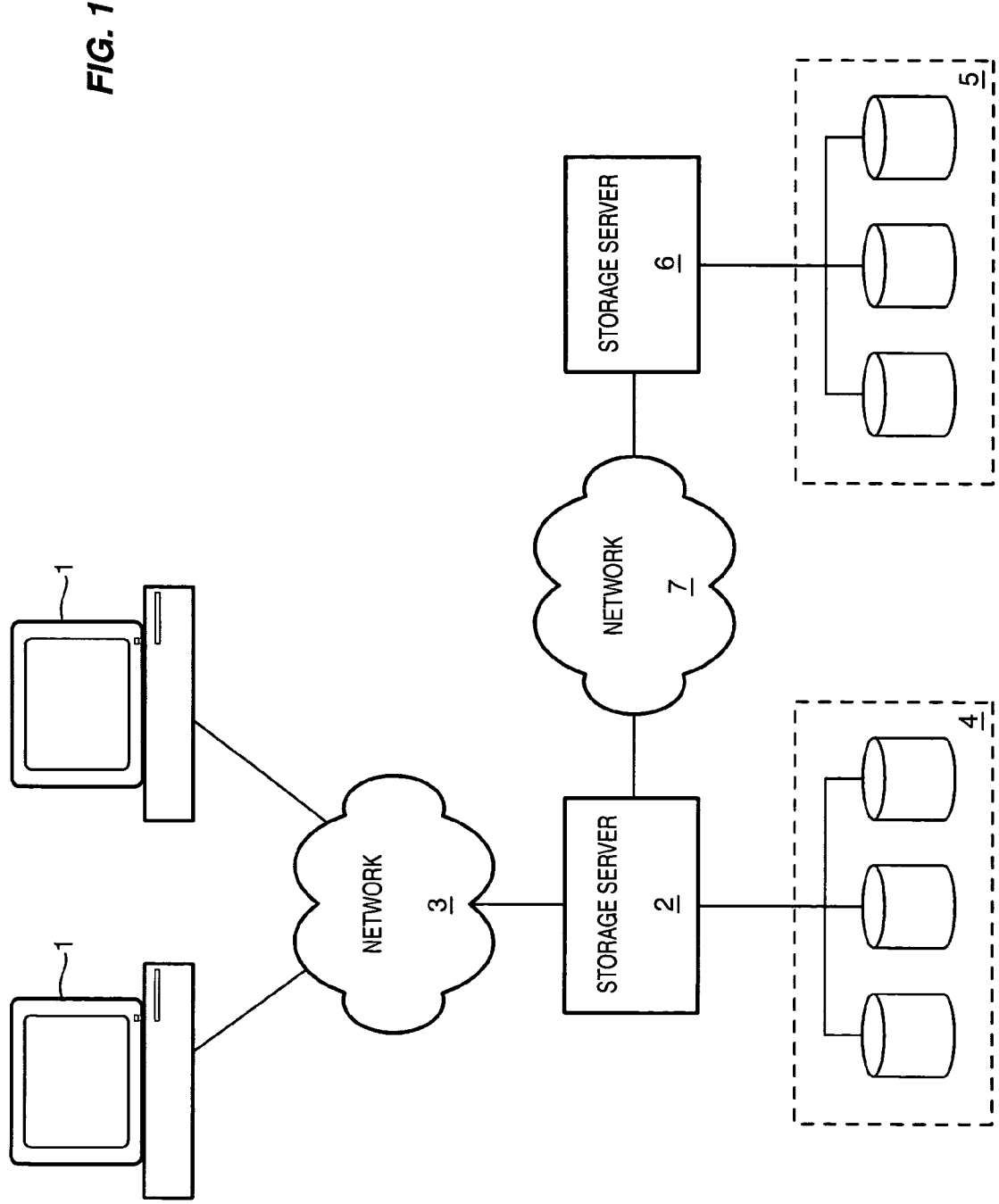
FIG. 1 illustrates an example of a network configuration to facilitate data replication relationship.

A method and apparatus for managing data replication relationships is described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

As described in greater detail below, a server in a network of storage servers can be designated as a manager server to manage the data replication relationships implemented between the storage servers of the network. Central management can include the creation of replication policies that can be applied to individual relationships. A change to a policy can be automatically propagated to each relationship to which the policy applies, and conversely, a change in a policy can be automatically detected and used to update the policy controlling the relationship.

FIG. 1 illustrates an example of a network configuration to facilitate data replication. A number of client processing systems ("clients") 1 are coupled to a storage server 2 located at a primary site through a first network 3, such as a LAN. Each of the clients 1 may be, for example, a conventional personal computer (PC), workstation, or the like. The filer 2 provides the clients 1 with access to files stored on a first set of mass storage devices 4, such as magnetic or optical disks, which may be configured as one or more RAID groups. Data stored in mass storage devices 4 is considered to be the primary copy, which is replicated (a.k.a., mirrored) on a second set of mass storage devices 5 located at a remote secondary site, access to which is controlled by a second storage server 6.

In this description, the first storage server 2 is referred to as the source storage server 2, while the second storage server 6 is referred to as the destination storage server 6. The blocks of data being replicated from the source storage server 2 to the destination storage server 6 are referred to as the data source, while the location on the destination storage server where the data is replicated to is referred to as the data destination. The data source and the data destination could be located on any storage means, such as storage disks (e.g., mass storage device 5), and other volatile or non-volatile memory.

A data source can be any amount of data designated for replication. For example, a data source can be some commonly used data amount, such as a volume, a quota-tree (Q-Tree), or some other unit of data management. The combination of a data source and a data destination is referred to as a "relationship," or "data replication relationship." That is, a relationship determines what the data to be replicated is and to where this data is to be replicated.

Each relationship can have attributes that determine the behavior of the relationship. One relationship attribute is the update schedule. The update schedule controls how often, e.g. once a week or every five minutes, the data source is replicated to the data destination.

Relationships can have various other attributes, such as a "throttle" value that specifies the amount of bandwidth each update transfer is allowed to consume. Other attributes can include a restart value to indicate whether an aborted transfer should restart, a lag warning (in units of time) to indicate the amount of time allowed to go by without an update before a warning is generated, and a lag error (in units of time) to indicate the amount of time allowed to go by without an update before an error message is generated. A relationship having such attributes is generally referred to as an asynchronous relationship, whereas a relationship that continually replicates the data is generally referred to as a synchronous relationship. In one embodiment, the relationship information is stored in the destination storage server, e.g., in a configuration file.

The source storage server 2 and destination storage server 6 are coupled to each other through a network 7, such as a WAN or MAN, but a LAN is also possible. Networks 3 and 7 each may be, for example, a TCP/IP network or a Fibre-Channel network.

The configuration of FIG. 1 is a simple one, selected for this description to facilitate explanation of the definitions and techniques introduced herein. However, these techniques can also be applied in many other different network configurations. For example, in some alternative configurations, the destination storage server 6 may serve a separate set of clients coupled to it. As another example, at least some of mass storage devices 5 may be configured to operate under the direct control of the source storage server 2 and/or at least some of mass storage devices 4 may be configured to operate under the direct control of the destination storage server 6 (i.e., a cluster-failover configuration). Furthermore, in some configurations, one or more additional storage servers may be coupled to the source storage server 2 and/or to the destination storage server 6.

As described above, the configuration shown FIG. 1 is simple. However, if additional storage servers are connected to the network 7, dynamically managing the multiplicity of data replication relationships can become difficult. For example, update schedules for a group of data replication relationships can depend on one another, e.g., when a single database made up of multiple files is replicated using multiple relationships, which can be the case for large databases. To change the update schedule such a large example database, each relationship would need to be individually located among the storage servers and manually edited. Thus, centrally managing data replication relationships can make the data storage network easier to use and less prone to error.

Figure 2:
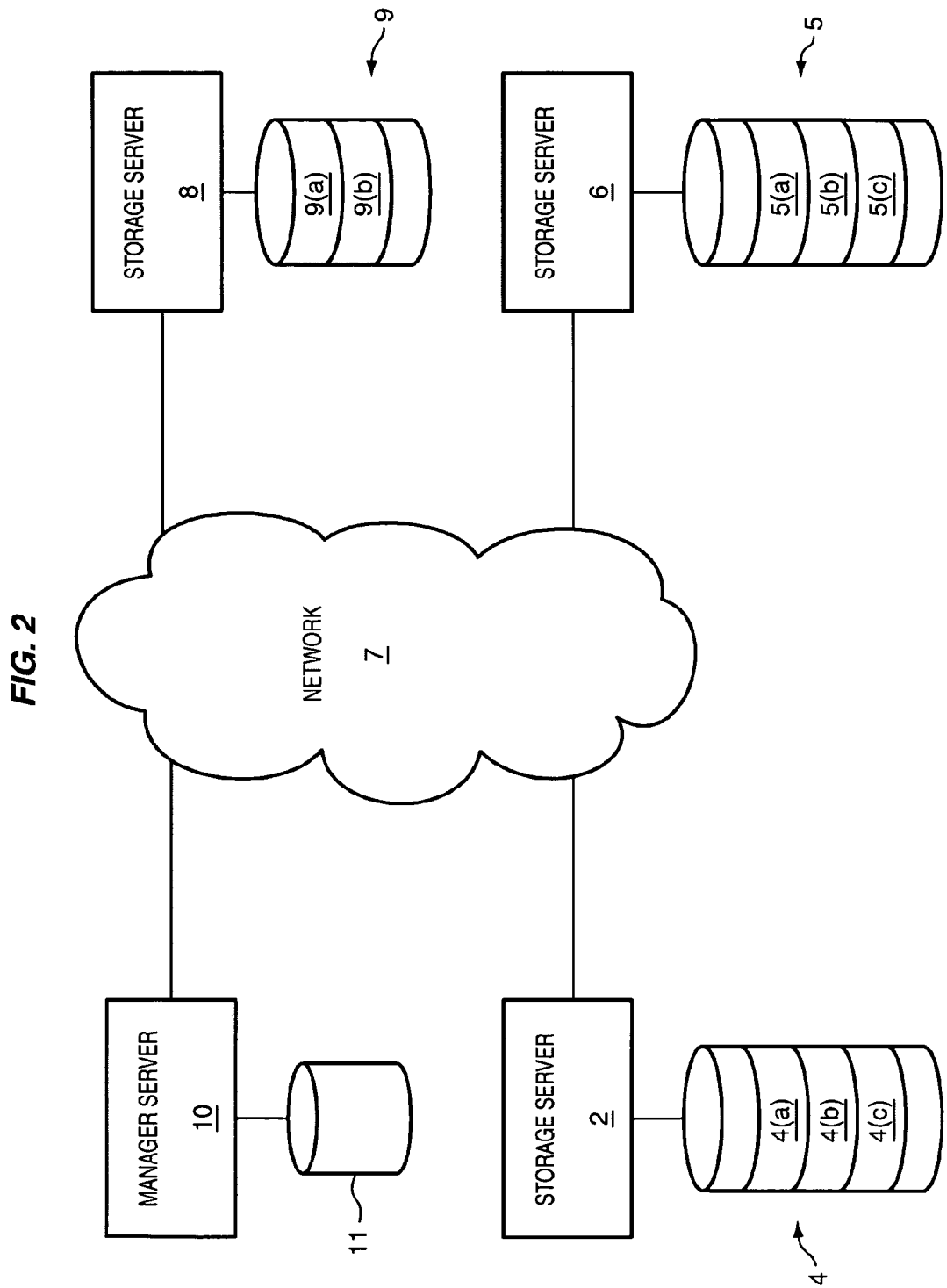
FIG. 2 illustrates a network configuration including a manager server to facilitate management of data replication relationships according to one embodiment of the present invention.

FIG. 2 shows an example network of storage servers similar to the network in FIG. 1. For simplicity, only three storage servers (2, 6, 8) are shown. Also, the mass storage devices described with reference to FIG. 1 (4, 5, 9, 11) are shown as a single storage for simplicity.

FIG. 2 also shows storage devices 4(a)-4(c) associated with storage server 2, storage devices 5(a)-5(c) associated with storage server 6, and storage devices 9(a) and 9(b) associated with storage server 8. In the example illustrated with reference to FIG. 2, storage device 4(a) is a data source that is replicated to storage device 5(c), storage device 4(c) is a data source that is replicated to storage device 9(b), storage device 5(b) is a data source that is replicated to data destination 4(b), and storage device 9(a) is a data source that is replicated to data destination 5(a).

Also shown in FIG. 2, is manager server 10. Manager server 10 can be a storage server, or it can be a specialized server specifically configured for central management. In one embodiment, any storage server connected to network 7 can act as a manager server 10. Thus, which storage server is the manager server 10 is relative in such an embodiment. That is, a server can function like a manager server 10 for some purposes and like a storage server for other purposes.

In another embodiment the manager server can be any computing server connected to the network, and can be implemented using software running on a Solaris, Linux, or Windows platform. Other similar platforms can also be used. The name "manager server" is purely descriptive; a manager server is any server being used by a user to centrally manage remote and local data replication relationships.

In one embodiment, the manager server is a server running a Data Fabric Manager™ (DFM) application on a server platform discussed above. DataFabric Manager is a simple, yet powerful application for managing a distributed storage infrastructure consisting of NetApp storage and NetCache content delivery systems. DFM's support for logical group formation enables administrators to effectively manage large numbers of distributed devices through one centralized interface. Common tasks such as device configuration, software upgrades, provisioning, backup, and monitoring are simplified through device and file system consolidation. Group-based management and monitoring not only alleviate the need for a large IT staff but also provide administrators with a global view of how their network and storage infrastructure is performing on a real-time basis. DFM also helps ensure data availability and business continuance by allowing administrators to proactively predict and protect against increased demand for storage and data resources through the use of quotas, threshold settings, and the prepositioning of data.

In one embodiment, the manager server 10 allows a user to manage all of the data replication relationships (that is four relationships in the simplified example of FIG. 2) centrally. In one embodiment, a data structure, e.g., a database, is provided that collects and stores all relationships implemented over the network 7. Such a data structure can be stored in the storage 11 associated with the manger server 10.

Providing a central management database for the data replication relationships implemented by the storage servers is highly convenient. In one embodiment, the storage servers can be configured to automatically report all relationships to the manager server 10, so that the manager server 10 can update the appropriate data structure.

In one embodiment, the manager server 10 allows a user to create replication policies and to use the data structure to apply a replication policy to each of the data replication relationships. An asynchronous replication policy can include a unique name for the policy, a throttle, and a replication schedule as described above. Such policies can include other attributes, such as an indicator whether an aborted update should restart, a lag-warning time, and a lag-error time. A synchronous policy can similarly have a name, and could indicate the amount of data allowed to be outstanding and the interval for which persistent consistency point images (PCPIs) of the source are created.

In one embodiment, the data structure storing the relationships in the manager server can be used by the manager server 10 to apply the policies created by the user to the data replication relationships. In other words, the data structure can be used to assign each relationship to a replication policy. For example, an entry in the data structure could be: "data source, data destination, replication policy name." For example, a table data structure representing the relationships described in the example of FIG. 2 could appear as in Table 1:

TABLE 1

| Data Source | Data Destination | Policy Name |
| --- | --- | --- |
| 4(a) | 5(c) | Dbase Policy |
| 4(c) | 9(b) | Dbase Policy |
| 5(b) | 4(b) | Every-Hour Policy |
| 9(a) | 5(a) | Every-Hour Policy |

If a user wished to change the update schedule (or some other attribute) of a group of relationships encompassed by a policy, the user only needs to change the policy, which is then automatically applied by the manager server 10 to all data replication relationships associated with the policy. In one embodiment, any policy changes are also automatically propagated from the manager server 10 to the configuration files of the appropriate storage servers.

To further illustrate policy usage, data source 4(*a*) and 4(*c*) can be two volumes representing one database. Under the example policy shown in Table 1, the entire database is replicated once a day by the Dbase Policy. The user of the example system described with reference to FIG. 2 may desire to change the replication schedule for the entire database to twice a day backup. Using the data structure shown in Table 1 (which is implemented in the manager server 10 and accessed through a user interface), the user can change both necessary relationships by amending the Dbase policy itself to have a schedule of twice daily backup.

Figure 3:
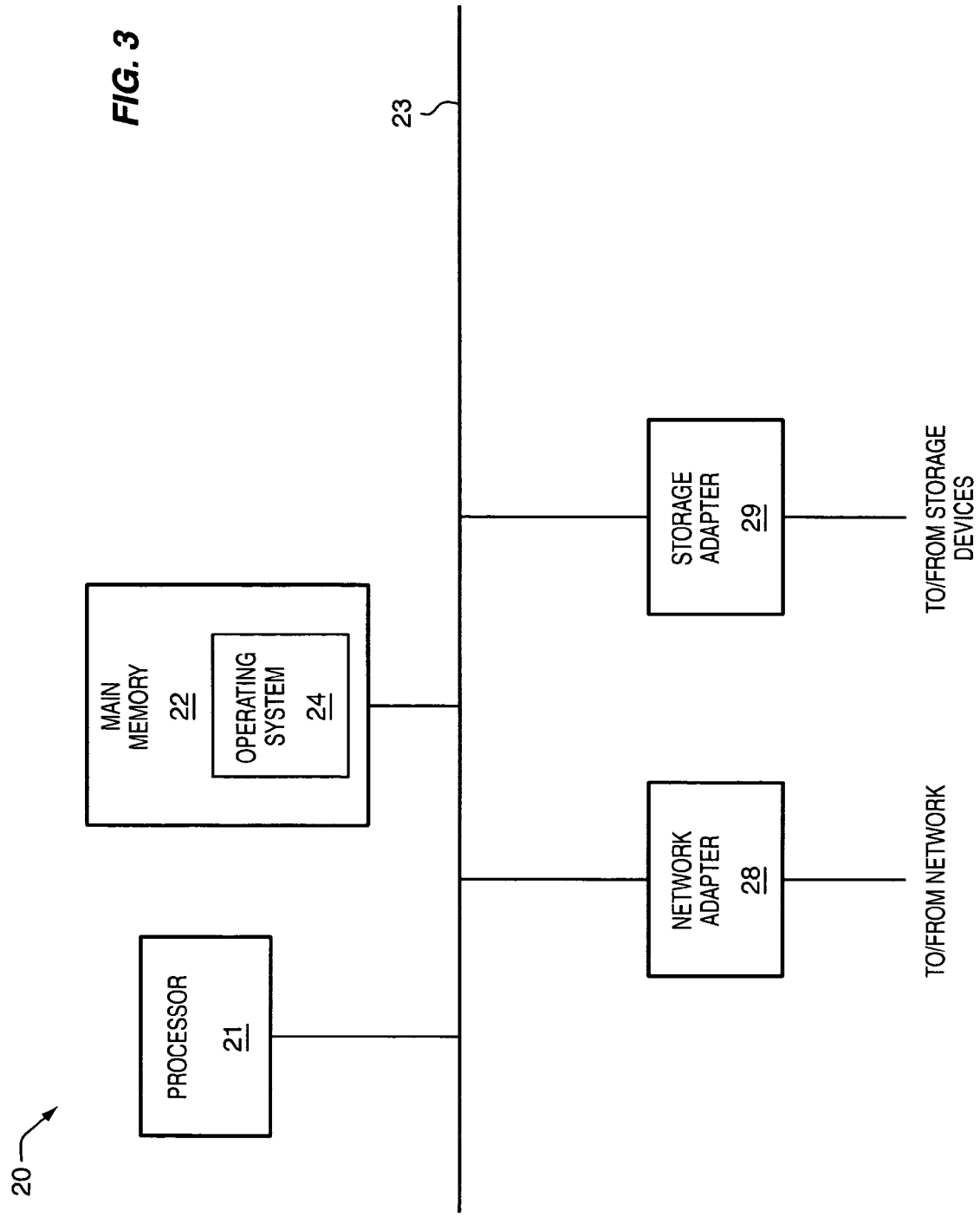
FIG. 3 is a conceptual block diagram of the architecture of a storage server according to one embodiment of the present invention.

FIG. 3 shows the architecture of a server 20, representative of the storage servers (2, 6, and 8) or the manager server 10, according to certain embodiments of the invention. Note that certain standard and well-known components which are not germane to the present invention are not shown. The server 20 includes a processor 21 and main memory 22, coupled together by a bus system 23. The bus system 23 in FIG. 3 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 21 is the central processing unit (CPU) of the server 20 and, thus, controls the overall operation of the server 20. In certain embodiments, the processor 21 accomplishes this by executing software stored in main memory 22. The processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 22, which is generally some form of random access memory (RAM), stores the operating system 24 of the server 20. Techniques of the present invention may be implemented within the operating system 24, as described further below.

Also connected to the processor 21 through the bus system 23 are a network adapter 28 and a storage adapter 29. The network adapter 28 provides the server 20 with the ability to communicate with remote devices, such as clients and/or another storage or manager server, over a network and may be, for example, an Ethernet adapter. The storage adapter 29 allows the filer to access the external mass storage devices and may be, for example, a Fibre Channel adapter or SCSI adapter.

Figure 4:
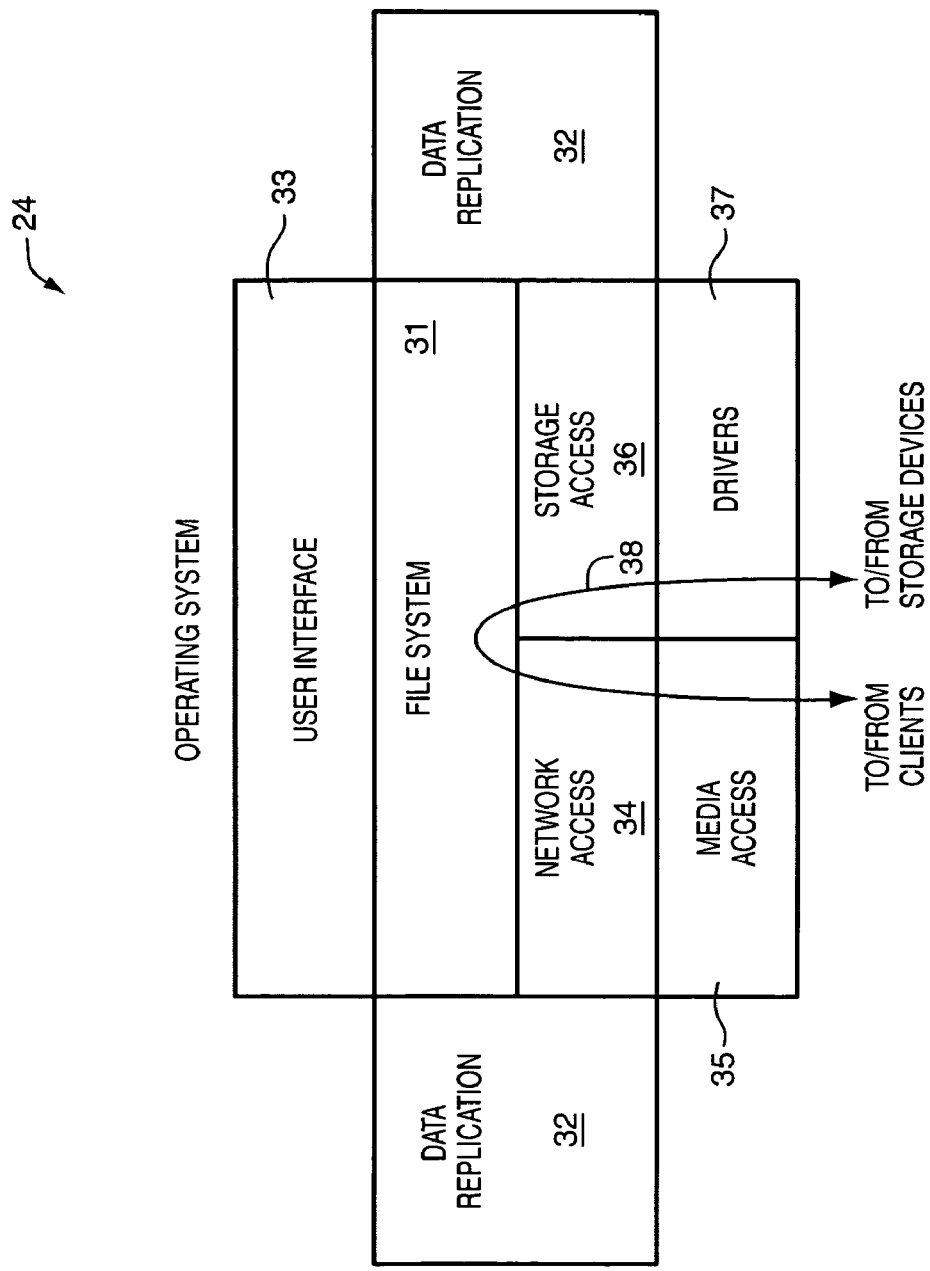
FIG. 4 is a block diagram of the operating system of a storage server.

FIG. 4 illustrates the operating system 24 of the server 20, according to certain embodiments of the invention. As can be seen, the operating system 24 includes a number of layers. The core of the operating system 24 is the file system 31 which, among other responsibilities, executes read and write operations on the mass storage devices in response to client requests, maintains directories, and manages consistency point operations. An example of a file system suitable for this purpose is the Write Anywhere File Layout to (WAFL) file system from Network Appliance, such as used in the NetApp Filers. The file system 31 operates on blocks of data of a predetermined size, such as 4 kbytes. Also shown in FIG. 4 is the logical data path 38 from clients to mass storage devices, through the file system 31.

Above the file system 31, the operating system 24 also includes a user interface 33, through which a network administrator or other user can control and/or configure the filer (e.g., remotely from a management station). The user interface 33 may generate a command line interface and/or a graphical user interface for this purpose.

Below the file system 31, on the client side the operating system 24 includes a network layer 34 and, at the lowest level, a media access layer 35. The network access layer 34 implements any of various protocols used to communicate with client devices, such as network file system (NFS), common Internet file system (CIFS) and/or hypertext transport protocol (HTTP). The media access layer 35 includes one or more drivers which implemented the protocols used to communicate over the network, such as Ethernet.

Below the file system 31 on the storage device side, the operating system 24 includes a storage access layer 36 and, at the lowest level, a driver layer 37. The storage access layer 36 implements a disk storage protocol such as RAID, while the driver layer 37 implements a lower-level storage device access protocol, such as Fibre Channel or SCSI.

The operating system of 24 also includes a data replication module 32, which is operatively coupled to the file system 31 and the storage access layer 36. The data replication module 32 controls the synchronization of data at the remote secondary site with data stored at the primary site. The techniques introduced herein may be implemented at least partially within the data replication module 32.

With the thorough understanding of storage servers and centrally managing data replication relationships using replication policies provided by the descriptions above, various embodiments for system initialization are now set forth with reference to FIG. 5. When the central management system that enables a storage server to act as a manager server is first installed, there is yet no central database of the data replication relationships implemented across the network of storage servers. Furthermore, no replication policies yet exist. In one embodiment, upon installation, the central management system—for example the DFM application described above—scans the network to collect the relationships, and automatically creates policies according to which it organizes these relationships.

Figure 5:
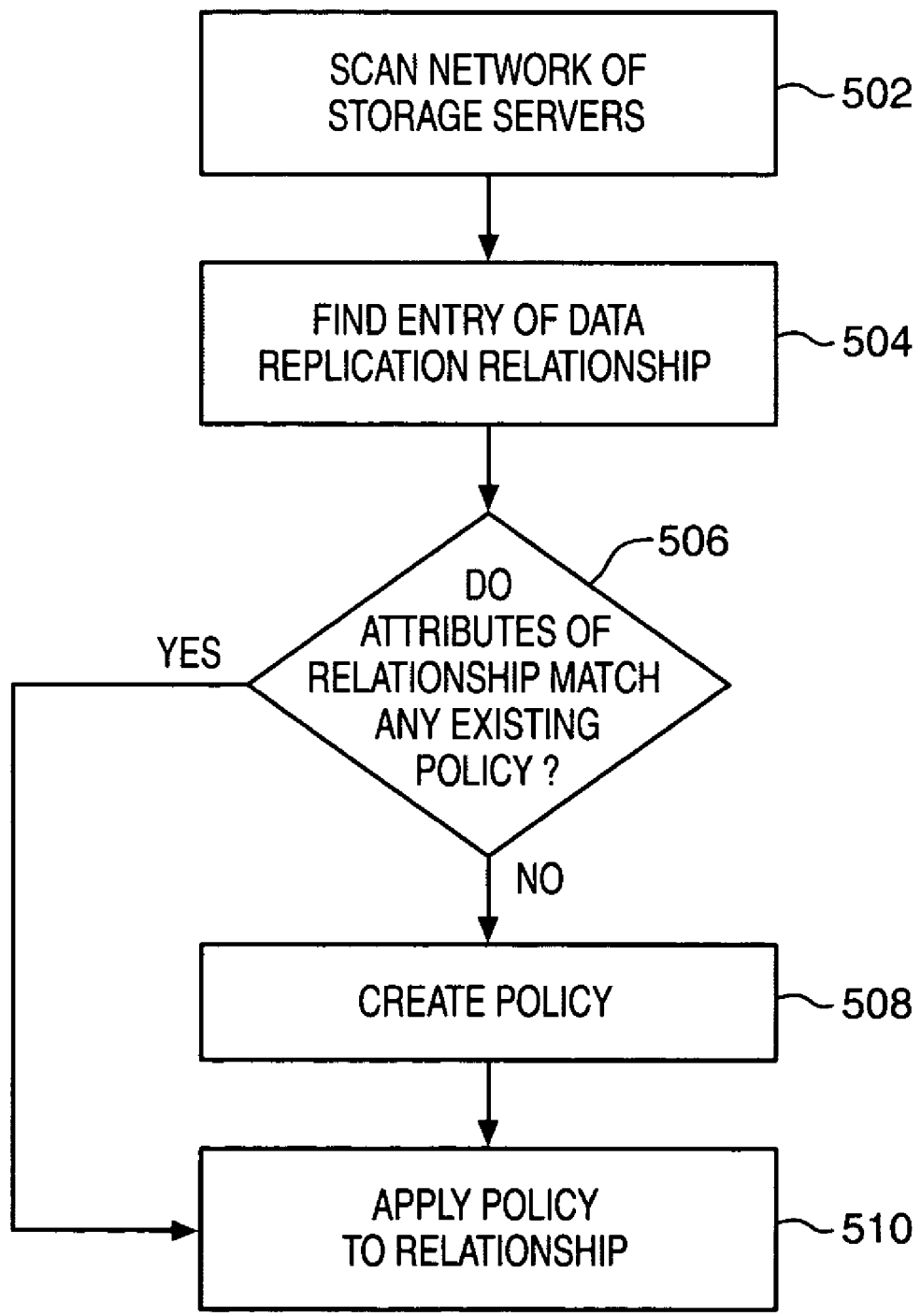
FIG. 5 is a flow diagram of initializing and updating a central data structure according to one embodiment of the present invention.

In one embodiment shown in FIG. 5, in block 502, the network is scanned. In one embodiment, this involves scanning the configuration files of the storage servers connected to the network. This can be carried out by querying the storage servers, or by any other scanning technique. A relationship is found in block 504. In one embodiment, the relationship includes the data source and destination, and the replication attributes, such as the update schedule, the throttle, and other similar attributes described above.

In block 506, the manager server checks whether there already is an existing replication policy with the attributes of the relationship found in block 504. In one embodiment, all attributes must match (e.g., not just update schedule, but also throttle and other attributes) exactly to an existing policy. If such a policy is found, it is applied, in block 510, to the relationship found in block 504. In one embodiment, this includes storing the data source and data destination of the relationship in a data structure similar to Table 1, and associating the matching policy with the new entry.

If, on the other hand, a matching policy is not found, then in block 508, a replication policy having the attributes of the relationship found in block 504 is created. In one embodiment, since this policy is a new and unique policy, the policy is given a unique name, i.e., a name different from the names of all other policies. In block 510, this newly created policy is applied, by entry into the data structure shown in Table 1, to the relationship found in block 504. Blocks 504 to 510 are repeated until all data replication relationships implemented by the storage servers attached to the network have been entered into the central data structure with an associated replication policy.

After this initial network scan and central management data structure establishment, a user can edit the policies at the management server, or the individual relationships at both the central management server and at the individual storage servers. In one embodiment, the manager server implements a monitor thread to keep the central data structure up to date. For example, if a policy is edited, the monitor thread ensures that the new replication attributes are propagated to each individual storage server affected by the change, that is, each storage server implementing a relationship associated with the edited policy. Similarly, the editing of a data source and/or destination in the central data structure is also propagated to the appropriate storage servers.

In one embodiment, the monitor thread also detects edits and changes in the relationships across the storage servers, and updates the central data structure of the manager server accordingly. For example, if the update schedule of a data replication relationship is changed in a storage server connected to the network, then the monitor thread can perform blocks 506 to 510 in FIG. 5 on the edited relationship. That is, an edited relationship can be reclassified into a policy matching the edited attributes, or a new policy automatically created to reflect the new attributes of the edited relationship.

To make replication policies easier to create, the user interface described above can provide the user of the system with a policy-cloning tool. In one embodiment, a graphical user interface (GUI) is provided to enable the user to author and edit policies (this feature may be referred to as the policy editor), and to enable the user to view the central data structure and to apply the policies to the data replication relationships contained therein (this feature may be referred to as the relationship manager). The policy editor feature can allow a user to configure each attribute of a replication policy. A policy-cloning tool can enable the user to select a policy, and create a clone, i.e., copy, of the policy.

In one embodiment, the cloned policy has identical attributes to the originally selected policy, except it has a unique, and hence different, name. For example, the world "cloned" or "copy of" can be added to the name of the original policy, if such addition would make the name of the new policy unique. The user can then use the policy editor to change certain attributes and the relationship manager to associate certain relationships with the newly cloned policy.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

Thus, a method and apparatus for a manager server configured to centrally manage data replication relationships have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. An apparatus to enable a user to manage data replication policies, the apparatus comprising:
    a graphical user interface to output to the user a representation of contents of a data structure containing a plurality of data replication relationships implemented by a plurality of storage servers and an indication of a first replication policy, the graphical user interface being configured to enable the user to apply the first replication policy to a first data replication relationship of the plurality of data replication relationships;
    a policy cloning tool to allow the user to select the first replication policy for cloning and to automatically clone the first replication policy in response to the user's selection, wherein the cloned first replication policy has identical attributes to the first replication policy;
    a policy editor to enable the user to rename the cloned first replication policy and to specify a change to an attribute of the cloned first replication policy to produce a second replication policy which is different from the first replication policy; and
    a relationship manager to allow the user to apply the second replication policy to a second data replication relationship of the plurality of data replication relationships.

2. The apparatus of claim 1, wherein the policy editor further enables the user to change any attributes of the cloned replication policy.

3. The apparatus of claim 1, wherein the policy editor further enables the user to create additional replication policies.

4. A method comprising:
    displaying a representation of a data structure to a user, the data structure containing a plurality of data replication relationships implemented by a plurality of storage servers;
    applying at least one of a plurality of replication policies to each data replication relationship in the data structure;
    selecting a first replication policy of the plurality of replication policies, for cloning;
    cloning the first replication policy in response to the user's selection, wherein the cloned first replication policy has identical attributes to the first replication policy;
    in response to inputs from the user, renaming the cloned first replication policy and changing an attribute of the cloned first replication policy to produce a second replication policy which is different from the first replication policy; and
    applying the second replication policy to a second data replication relationship of the plurality of data replication relationships in response to an input from the user.

5. The method of claim 4 further comprising allowing the user to change any attributes of the cloned replication policy.

6. The method of claim 5 further comprising allowing the user to create additional replication policies.

7. A machine-readable storage medium storing instructions which, when executed in a machine, cause the machine to perform a process that comprises:
    generating a user interface to enable a user to apply any of a plurality of replication policies to each of a plurality of data replication relationships implemented by a plurality of storage servers on a network;
    enabling the user to input a selection of a first replication policy of the plurality of replication policies, for cloning;
    cloning the first replication policy in response to the selection, so that the cloned first replication policy has identical attributes to the first replication policy;
    in response to user input, renaming the cloned first replication policy and changing an attribute of the cloned first replication policy to produce a second replication policy which is different from the first replication policy; and
    in response to user input, applying the second replication policy to a second data replication relationship of the plurality of data replication relationships.

8. A machine-readable storage medium as recited in claim 7, said process further comprising allowing the user to change any attributes of the cloned replication policy.

9. A machine-readable storage medium as recited in claim 8 said process further comprising allowing the user to create additional replication policies.

* * * * *